US009475463B2

(12) United States Patent
Watanabe et al.

(10) Patent No.: US 9,475,463 B2
(45) Date of Patent: Oct. 25, 2016

(54) AIR-CONDITIONER FOR VEHICLE

(75) Inventors: Masashi Watanabe, Kariya (JP);
Kouichi Tabei, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 375 days.

(21) Appl. No.: 14/122,189

(22) PCT Filed: Apr. 17, 2012

(86) PCT No.: PCT/JP2012/002634
§ 371 (c)(1),
(2), (4) Date: Nov. 25, 2013

(87) PCT Pub. No.: WO2012/164812
PCT Pub. Date: Dec. 6, 2012

(65) Prior Publication Data
US 2014/0087644 A1    Mar. 27, 2014

(30) Foreign Application Priority Data

May 30, 2011    (JP) .................................. 2011-120505

(51) Int. Cl.
  *B60S 1/02*    (2006.01)
  *B60H 1/00*    (2006.01)
  *B60S 1/54*    (2006.01)
(52) U.S. Cl.
  CPC ........... *B60S 1/023* (2013.01); *B60H 1/00785* (2013.01); *B60H 1/00842* (2013.01); *B60S 1/54* (2013.01)

(58) Field of Classification Search
  CPC ............ B60H 1/00785; B60H 1/3207; B60H 1/00842; B60H 1/00849
  USPC .......................................................... 454/75
  See application file for complete search history.

(56) References Cited

U.S. PATENT DOCUMENTS 5,931,006 A * 8/1999 Straub ................ B60H 1/00785
                                                              236/49.3

(Continued)

FOREIGN PATENT DOCUMENTS

JP       S61-139514 A      6/1986
JP       62-14410 B2       4/1987

(Continued)

OTHER PUBLICATIONS

International Search Report and Written Opinion of the ISA for PCT/JP2012/002634, ISA/JP, mailed Jul. 17, 2012.

*Primary Examiner* — Steven B McAllister
*Assistant Examiner* — Ko-Wei Lin
(74) *Attorney, Agent, or Firm* — Harness, Dickey & Pierce, P.L.C.

(57) ABSTRACT

In a vehicle air conditioner, even in a case where an air outlet mode is set in which an air outlet switching damper opens a defroster opening so as to blow air from the defroster opening toward an inner surface of a window glass of a vehicle, the air outlet switching damper is controlled to close the defroster opening when a target air temperature TAO is lower than an outside air temperature TAM. Thus, the vehicle air conditioner prevents a fogging of an outer surface of the window glass without decreasing a temperature comfort in a vehicle compartment.

4 Claims, 6 Drawing Sheets

(56) References Cited

U.S. PATENT DOCUMENTS

2002/0166332 A1* 11/2002 Kelly ................... B60H 1/3207
                                                            62/176.6
2006/0270333 A1    11/2006 Hirai et al.
2009/0117841 A1*  5/2009 Goto ................. B60H 1/00064
                                                            454/127

FOREIGN PATENT DOCUMENTS

| JP | 05-001515 U | 1/1993 |
| JP | H07-172140 A | 7/1995 |
| JP | 2000-103323 A | 4/2000 |
| JP | 2007-008449 | 1/2007 |
| JP | 2010-167895 A | 8/2010 |

* cited by examiner

AIR-CONDITIONER FOR VEHICLE

CROSS REFERENCE TO RELATED APPLICATION

This application is a 371 U.S. National Phase of PCT/JP2012/002634, filed Apr. 17, 2012, based on Japanese Patent Application No. 2011-120505 filed on May 30, 2011, the contents of both of which applications are incorporated herein by reference in their entirety.

FIELD OF THE INVENTION

The present disclosure relates to a vehicle air conditioner which can blow conditioned air toward an inner surface of a vehicle window, for performing an anti-fog operation.

BACKGROUND OF THE INVENTION

For example, in a case that temperature and humidity of outside air are both relatively high after rain in an early summer or in an early autumn, an air temperature blown into a vehicle compartment is set relatively low in a vehicle air conditioner in order to provide occupant's comfort in the vehicle compartment. In such case, if air is blown toward the inner surface of a windshield of the vehicle, a fog may be formed on an outer surface of the windshield of the vehicle, which may obscure a view of an occupant in the vehicle. In view of the above, in a well-known conventional technique, when a temperature of the outside air is high, a blown air temperature is increased to prevent a fogging on the outer surface of the windshield (see patent document 1).

However, in the above-mentioned conventional vehicle air conditioner, because air having a relatively high temperature is blown into the vehicle compartment from a defroster air outlet when the outside air temperature is relatively high, it may be difficult to maintain a temperature comfort in the vehicle compartment, thereby causing a discomfort of an occupant in the vehicle compartment.

PRIOR ART DOCUMENT

Patent document 1: JP-U-H5-1515

SUMMARY OF THE INVENTION

In view of the foregoing matters, it is an object of the present disclosure to provide an air conditioner for a vehicle, which can prevent a fog formation on an outer surface of a window glass without deteriorating a temperature comfort in a vehicle compartment.

According to a first aspect of the present disclosure, an air conditioner for a vehicle includes: an air conditioning duct forming therein an air passage through which air to be blown into a vehicle compartment flows; a defroster opening that is provided in the air conditioning duct and is connected to a defroster air outlet from which air is blown toward an inner surface of a window glass of the vehicle; extra-defroster openings that are provided in the air conditioning duct and are respectively connected to extra-defroster air outlets other than the defroster air outlet, from which air is blown into the vehicle compartment; a door device that opens and closes the defroster opening; an air-outlet mode setting portion configured to set an air outlet mode for blowing air into the vehicle compartment from the defroster opening and the extra-defroster openings; a first temperature obtaining portion which obtains, as a first temperature, a temperature of air to be blown from the defroster air outlet; a second temperature obtaining portion which obtains, as a second temperature, one of (i) a dew-point temperature of outside air on an outer surface of the window glass, and (ii) a relative temperature of the dew-point temperature, which is relative with and is higher than the dew-point temperature; and a controller which controls an open/close operation of the door device based on the air outlet mode set by the air-outlet mode setting portion, the first temperature obtained by the first temperature obtaining portion, and the second temperature obtained by the second temperature obtaining portion. The controller controls the door device to close the defroster opening, when the first temperature is lower than the second temperature even in a case where the air-outlet mode setting portion sets an air outlet mode in which the door device generally opens the defroster opening.

According to the above, even in an air outlet mode in which the door device opens the defroster opening for blowing the air from the defroster air outlet toward the inner surface of the window glass of the vehicle, when the first temperature which is a temperature of air blown from the defroster air outlet is lower than the second temperature that is either (i) the dew-point temperature of the outside air on the outer surface of the window glass or (ii) the relative temperature that is related with and is higher than the dew-point temperature of the outside air, the controller causes the door device to close the defroster opening.

When the first temperature that is the temperature of the air blown from the defroster air outlet is lower than the second temperature that is either (i) the dew-point temperature of the outside air on the outer surface of the window glass or (ii) the relative temperature that is related with and is higher than the dew-point temperature of the outside air, that is, when the outer surface of the window glass is prone to have a fog, the defroster opening is closed by the door device for prohibiting the air blowing toward the inner surface of the window glass even in a case where an air outlet mode for opening the defroster opening and for blowing the air from the defroster air outlet toward the inner surface of the window glass is set. Thus, it can prevent a fog formation on the outer surface of the window glass.

Therefore, it is not necessary to blow a high temperature air from the defroster air outlet into the vehicle compartment for preventing the fog formation on the outer surface of the window glass. Thus, even when the outside air temperature is relatively high, the fog formation on the outer surface of the window glass can be prevented, without decreasing temperature comfort in the vehicle compartment. In such manner, the fog formation on the outer surface of the window glass can be prevented without decreasing the temperature comfort in the vehicle compartment.

According to a second aspect of the present disclosure, the second temperature obtaining portion may obtain an outside air temperature that is the relative temperature of the dew-point temperature, as the second temperature. In order to perform an anti-fogging of the outer surface of the window glass, the second temperature compared with the first temperature is set to the outside air temperature, which is a relative temperature of the dew-point temperature relative with and is higher than the dew-point temperature of the outside air (i.e., equivalent to a dew-point temperature when the outside air has a relative humidity of 100%). Therefore, the second temperature is easily obtainable without detecting humidity of the outside air.

The vehicle air conditioner in the third example of the present disclosure may include an inside-outside air ratio regulator that regulates a flow ratio of inside air and outside air respectively introduced into the air conditioning duct. In this case, the controller controls the inside-outside air ratio regulator to increase the flow ratio of the outside air introduced into the air conditioning duct, and controls the door device such that air is blown into the vehicle compartment from the extra-defroster openings in an open state, when the door device is controlled by the controller to close the defroster opening based on the first temperature and the second temperature in a case where the air-outlet mode setting portion sets an air outlet mode in which the door device opens the defroster opening.

According to the above, the controller increases the ratio of the outside air to be introduced into the air conditioning duct by controlling the inside-outside air ratio regulator when the door device is controlled to close the defroster opening for prohibiting the air blowing toward the inner surface of the window glass. Therefore, a ratio of the outside air to be introduced into the air conditioning duct is increased, and thereby a greater amount of the outside air which usually has lower absolute humidity than the inside air is blown into the vehicle compartment from one or more of the extra-defroster openings in an open state. Thus, even when the defroster opening is closed by the door device, the fog formation on the inner surface of the window glass can be prevented.

According to a fourth aspect of the present disclosure, the vehicle air conditioner may further include an air amount regulator which regulates a flow amount of air to be blown into the vehicle compartment. In this case, the controller may control the air amount regulator to increase an amount of air to be blown into the vehicle compartment, and may control the door device such that air is blown into the vehicle compartment from the extra-defroster openings in an open state, when the door device is controlled by the controller to close the defroster opening based on the first temperature and the second temperature in a case where the air-outlet mode setting portion sets an air outlet mode in which the door device opens the defroster opening.

According to the above, when the air blowing toward the inner surface of the window glass is prohibited by closing the defroster opening, the controller controls the air amount regulator to increase the amount of air to be blown into the vehicle compartment from one or more of the extra-defroster openings in the open state. Therefore, an air flow in the vehicle compartment becomes active, and the air ventilation in the vehicle compartment, which is not air-tight in general, is facilitated. Thus, even when the defroster opening is closed by the door device, the fog formation on the inner surface of the window glass can be prevented.

According to a fifth aspect of the present disclosure, the vehicle air conditioner may further include a cooling heat exchanger which cools air flowing in the air conditioning duct, a cooling capacity adjustor which adjusts a cooling capacity of air at the cooling heat exchanger, and a temperature adjustor which performs a temperature adjustment of the air cooled by the cooling heat exchanger. In this case, the controller may control the cooling capacity adjustor to increase the cooling capacity of air at the cooling heat exchanger, may control the door device such that air is blown into the vehicle compartment from the extra-defroster openings in an open state, and may control the temperature adjustor not to change the temperature of air blown from the extra-defroster openings into the vehicle compartment before and after the increase of the cooling capacity of air at the cooling heat exchanger, when the door device is controlled by the controller to close the defroster opening based on the first temperature and the second temperature in a case where the air-outlet mode setting portion sets an air outlet mode in which the door device opens the defroster opening.

According to the above, when the air blowing toward the inner surface of the window glass is prohibited by closing the defroster opening, the controller controls the cooling capacity adjustor to increase the cooling capacity of the cooling heat exchanger that cools the air. Further, the controller controls the temperature adjustor not to change the temperature of the air to be blown into the vehicle compartment from the extra-defroster openings. Therefore, the air is dehumidified by the increased cooling capacity of the cooling heat exchanger, and the temperature of the cooled air for dehumidification is adjusted by the temperature adjustor, and the dehumidified air is blown into the vehicle compartment. Thus, even when the defroster opening is closed by the door device, the fog formation on the inner surface of the window glass can be prevented.

DETAILED DESCRIPTION OF THE PREFERRED EMBODIMENTS

Figure 1:
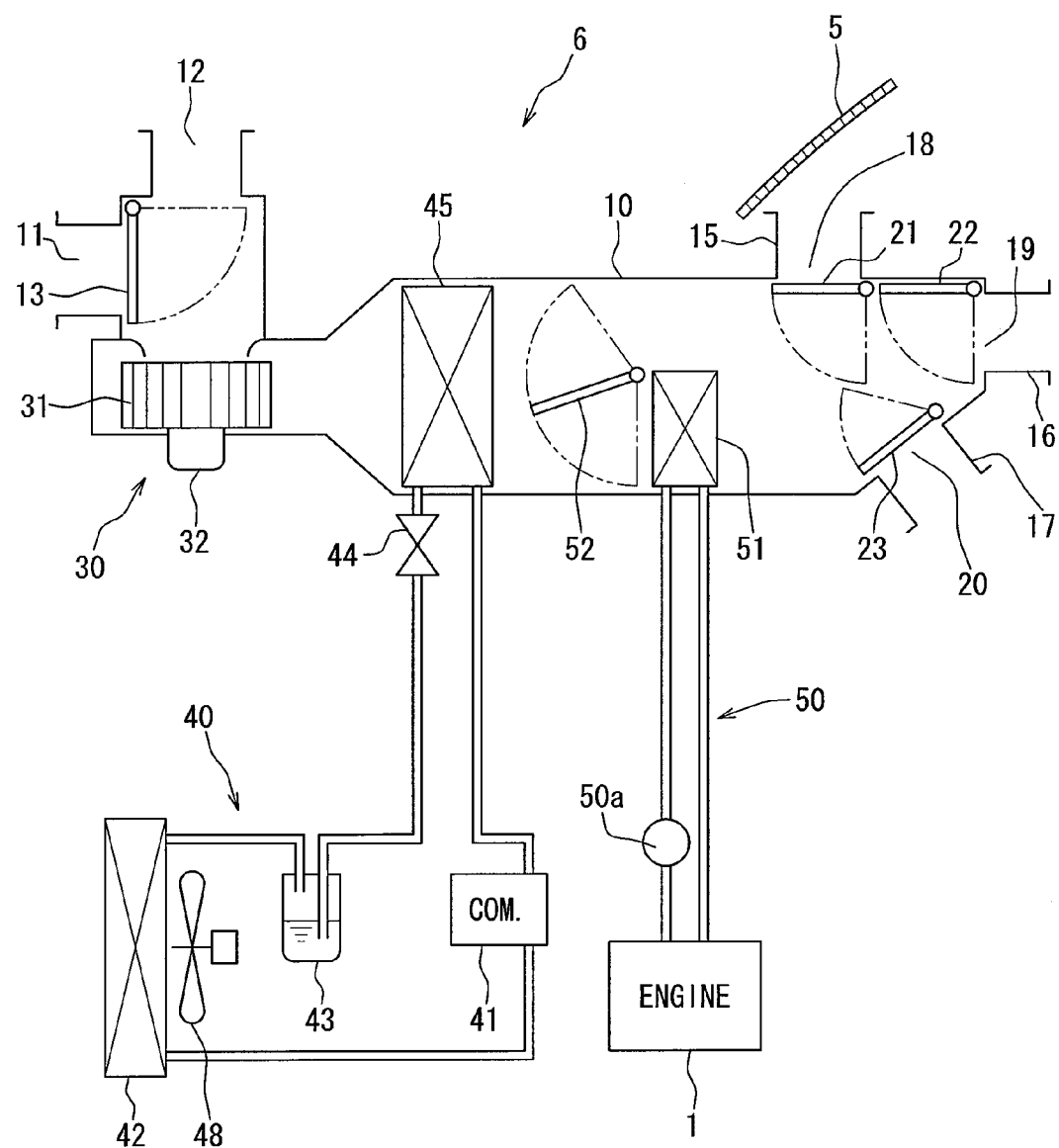
FIG. 1 is an entire schematic diagram of a vehicle air conditioner in a first embodiment of the present disclosure.

Referring to the drawings, embodiments of the present disclosure will be described hereinafter. In these embodiments, the same parts and components as those in each embodiment are indicated with the same reference numerals and the same descriptions will not be reiterated. In a case that only a part of component or part is described, other descriptions for the remaining part of component or part in the other description may be incorporated. Components and parts corresponding to the components and parts described in the preceding description may be indicated by the same reference number and may not be described redundantly. The embodiments may be partially combined or partially exchanged in some forms which are clearly specified in the following description. In addition, it should be understood that, unless trouble arises, the embodiments may be partially combined or partially exchanged each other in some forms which are not clearly specified.

(First Embodiment)

Figure 2:
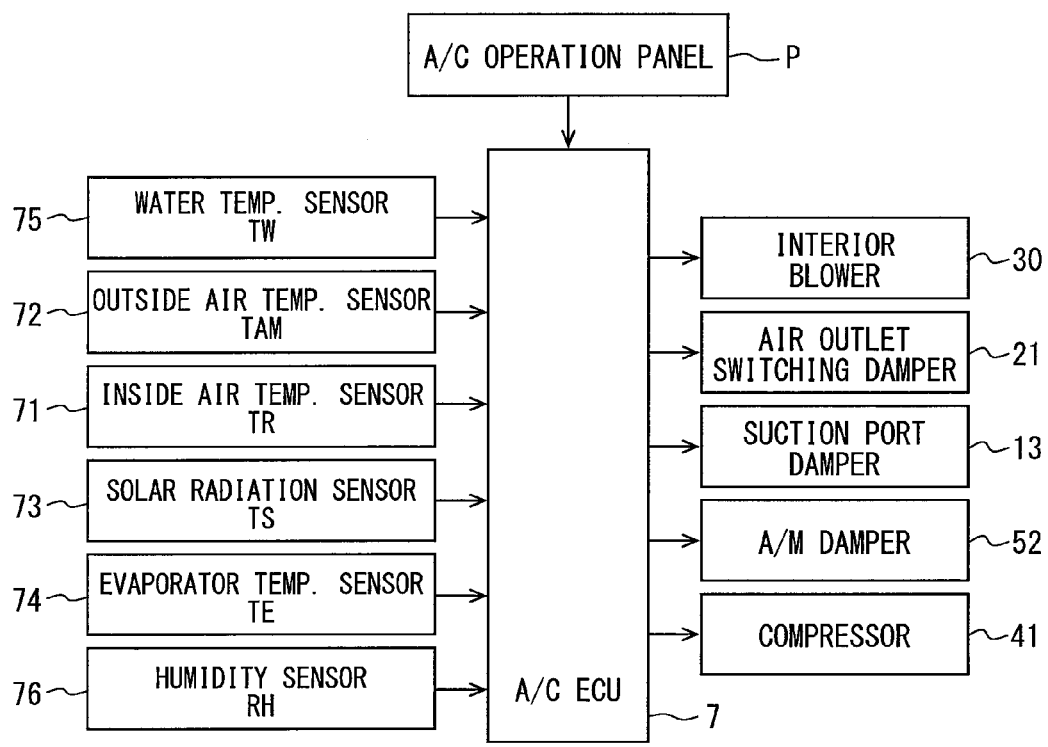
FIG. 2 is a block diagram showing a control system of the vehicle air conditioner in the first embodiment.

FIG. 1 is an entire schematic diagram showing a vehicle air conditioner in a first embodiment of the present disclosure. FIG. 2 is a block diagram of a control system of the vehicle air conditioner in the first embodiment.

The air conditioner of the present embodiment is an automatic air conditioner configured so that an automatic control of the temperature of a vehicle compartment is performed for approaching a preset temperature by controlling each of the air-conditioning parts (e.g., actuators etc.) of an air conditioning unit 6, which air-conditions an inside of the vehicle compartment, under control of an air-conditioning control system (i.e., A/C ECU) 7.

The air conditioning unit 6 includes, as shown in FIG. 1, an air conditioning duct 10 which forms an air passage for guiding conditioned air into the vehicle compartment, a centrifugal-type blower 30 which generates an air flow in the air conditioning duct 10, a refrigeration cycle 40 which cools air flowing inside of the air conditioning duct 10, a coolant (i.e., hot water) circuit 50 which heats air flowing inside of the air conditioning duct 10 so as to perform a heating operation of an interior of the vehicle compartment, and the like.

The air conditioning duct 10 is positioned at a front part in the vehicle compartment. An upstream side (i.e., a windward side) of the air conditioning duct 10 is a portion which constitutes an inside-outside air (i.e., suction port) switch box, and has an inside air suction port 11 through which air inside the vehicle compartment (i.e., inside air) is introduced, and an outside air suction port 12 through which air outside of the vehicle compartment (i.e., outside air) is introduced. Further, in an inside of the inside air suction port 11 and the outside air suction port 12, an inside-outside air (i.e., suction port) switching damper 13 (i.e., an inside-outside air switching door) is rotatably attached. The inside-outside air switching damper 13 is driven by actuators such as a servomotor, and switches a suction port mode among an inside air circulation mode, an outside air introduction mode, etc. The inside-outside air switching damper 13 corresponds to an inside-outside air ratio regulator which adjusts a ratio of inside air and outside air that are to be introduced into the air conditioning duct 10.

A downstream side (i.e., a leeward side) of the air conditioning duct 10 is a portion which constitutes an air outlet mode switching part, and has a defroster (DEF) opening 18, a face (FACE) opening 19, and a foot (FOOT) opening 20 formed therein. Further, a defroster duct 15 is connected to the defroster opening 18, so that warm air is blown off from a defroster (DEF) air outlet at a most downstream end of the defroster duct 15 mainly toward an inner surface of a windshield 5 of the vehicle.

A face duct 16 is connected to the face opening 19, so that cool air is mainly blown off from a face (FACE) air outlet at a most downstream end of the face duct 16 toward an occupant's chest part and head part. A foot duct 17 is connected to the foot opening 20, so that warm air is mainly blown off from the foot (FOOT) air outlet at a most downstream end of the foot duct 17 toward the occupant's foot part.

Inside of the defroster opening 18, an air outlet switching damper (i.e., a defroster door) 21 is rotatably disposed to open and close the defroster opening 18. Inside of the face opening 19, an air outlet switching damper (i.e., a face door) 22 is rotatably disposed to open and close the face opening 19. Inside of the foot opening 20, an air outlet switching damper (foot door) 23 is rotatably disposed to open and close the foot opening 20. The air outlet switching damper (i.e., defroster door) 21 corresponds to a door device which opens and closes the defroster opening 18.

The three air outlet switching dampers (i.e., air outlet switching door) 21, 22, 23 are respectively driven by actuators, such as servomotors, such that the air outlet mode is switched to either a face (FACE) mode, a bi-level (B/L) mode, a foot (FOOT) mode, a foot-defroster (F/D) mode or a defroster (DEF) mode.

The face mode is a mode which closes the defroster opening 18, opens the face opening 19 and closes the foot opening 20. The bi-level mode is a mode which closes the defroster opening 18, opens the face opening 19, and opens the foot opening 20. The foot mode is a mode which slightly opens the defroster opening 18 (i.e., a degree of opening of the defroster opening 18 is smaller than the foot-defroster mode), closes the face opening 19 and opens the foot opening 20.

The foot-defroster mode is a mode which opens the defroster opening 18, closes the face opening 19 and opens the foot opening 20. The defroster mode is a mode which opens the defroster opening 18, closes the face opening 19, and closes the foot opening 20. Although it is not illustrated, the air conditioning duct 10 of the present embodiment is provided with a side face opening which is connected to a side face air outlet and is always open, so that cool air is blown off from the side face air outlet toward the occupant's head/chest part, or a warm air is blown off toward an inner surface of a side window glass.

The face opening 19, the foot opening 20, and the side face opening correspond to extra-defroster openings other than the defroster opening in the present embodiment.

The blower 30 includes a centrifugal type fan 31 rotatably accommodated in a scroll case that is integrally configured with the air conditioning duct 10, and a blower motor 32 which rotates the centrifugal type fan 31. Further, an air blowing amount of the blower motor 32 (i.e., a rotation number of the centrifugal type fan 31) is controlled by a blower drive circuit based on a blower voltage impressed thereon. The blower motor 32 corresponds to an air blowing amount regulator which adjusts a flow amount of air blown into the vehicle compartment.

The refrigeration cycle 40 includes a compressor 41 which compresses a refrigerant, a condenser 42 which condenses and liquefies the compressed refrigerant, and a liquid receiver (i.e., a vapor-liquid separator) 43 which separates the condensed and liquefied refrigerant into liquid refrigerant and gas refrigerant to cause only the liquid refrigerant to flow toward a downstream side, an expansion valve (i.e., a decompression device) 44 which decompresses and expands the liquid refrigerant flowing from the liquid receiver 43, an evaporator 45 which evaporates the decompressed and expanded refrigerant, and refrigerant piping which connects those components and the like. Among those components, the evaporator 45 is a cooling heat exchanger which cools and dehumidifies air flowing in the air conditioning duct 10. The compressor 41 corresponds to a cooling capacity adjusting portion which adjusts the cooling capacity of the evaporator 45 for cooling the air.

The coolant circuit 50 is a circuit in which a water pump 50a is used to circulate the coolant warmed by a water jacket of an engine 1. The coolant circuit 50 includes a radiator, a thermostat, and a heater core 51. The heater core 51 is a heating heat exchanger for heating cool air by using the coolant flowing therethrough which has passed through the engine 1. That is, the coolant for cooling the engine 1 is used as a heat source to heat the cool air in the heater core 51.

The heater core 51 is disposed at a downstream side of the evaporator 45 in an air flow within the air conditioning duct 10. At an upstream air side of the heater core 51, an air mix damper (i.e., air mixing door) 52 is attached rotatably. The air mix damper 52 as an air temperature control portion is driven by an actuator such as a servomotor, so that a rotating position of the air mix damper 52 is adjusted. Therefore, a ratio between a flow amount of air (i.e., warm air) flowing through the heater core 51 and a flow amount of air (i.e., cool air) that bypasses the heater core 51 is adjusted by adjusting the rotating position of the air mix damper 52, so as to adjust the temperature of air blown into the vehicle compartment. The air mix damper 52 corresponds to a temperature adjusting portion by which the temperature of air having been cooled by the evaporator 45 is adjusted.

Although an air mixing type is used as an air temperature adjusting portion in the present embodiment, a re-heat type may be used as the air temperature adjusting portion. In the re-heat type, a flow amount adjusting valve controls a flow amount of coolant flowing in a heater core that is disposed on a downstream side of the evaporator in an air flow direction to cross with an entire area of air flowing in the air conditioning duct.

Next, the configuration of a control system of the present embodiment is explained based on FIG. 2. The air-conditioning ECU 7 receives switch signals and sensor signals from each of the various switches such as a temperature setting switch on an A/C operation panel P that is disposed at a front face in the vehicle compartment, sensors and the like.

Here, the various sensors include, as shown in FIG. 2, an inside air temperature sensor 71 for detecting an air temperature in the vehicle compartment (i.e., an inside air temperature) TR, an outside air temperature sensor 72 for detecting an air temperature outside of the vehicle compartment (i.e., an outside air temperature) TAM, a solar radiation sensor 73 for detecting an amount of solar radiation TS entering into the vehicle compartment, an evaporator surface temperature sensor (i.e., an evaporator temperature sensor) 74 for detecting an outer surface temperature TE of a heat exchanging portion, a water temperature sensor 75 for detecting a coolant temperature TW of the engine coolant which flows into the heater core 51, and a humidity sensor 76 (i.e., humidity detection portion) which detects a relative humidity RH of air in the vehicle compartment.

Among these, the evaporator-surface temperature sensor 74 is used as a thermistor that is, for detecting a fin temperature, arranged on a fin which is thermally connected to an outside surface of a refrigerant tube of the evaporator 45, in which the refrigerant flows through. Further, the humidity sensor 76 is disposed close to a window glass 5 or a lower part of an instrument board of vehicle etc. together with the inside air temperature sensor 71, for example, and generates a voltage that is proportional to a relative humidity of inside air of the vehicle compartment.

The inside air temperature sensor 71 and the humidity sensor 76 are disposed in a ventilation passage in which the air of the vehicle compartment flows, so as to detect the temperature and the humidity of the air passing through the ventilation passage. In such ventilation passage, an aspirator device is disposed, and the inside air of the vehicle compartment is ventilated into the ventilation passage by a flow amount that accords with the flow amount of air flowing in the air conditioning duct 10, by using a negative pressure caused according to the flow amount of air flowing in the air conditioning duct 10.

The air-conditioning ECU 7 includes therein a microcomputer having a CPU, a ROM, a RAM, etc. which are not illustrated, and sensor signals from each of the sensors 71-76 are input to the microcomputer after an A/D conversion that is performed by an input circuit (not shown) in the air-conditioning ECU 7.

The air-conditioning ECU 7 used as a controller in the present embodiment controls an operation of each of the components including the blower 30, the air outlet switching dampers 21-23, the inside-outside air switching damper (i.e., suction port damper) 13, the air mix damper 52, and the compressor 41, based on the input signal from each of the switches of the A/C operation panel P, and based on the input signal from each of the sensors 71-76, etc, in accordance with a procedure to be mentioned later.

Next, based on the above-mentioned configuration, the operation of the vehicle air conditioner of the present embodiment is explained.

Figure 3:
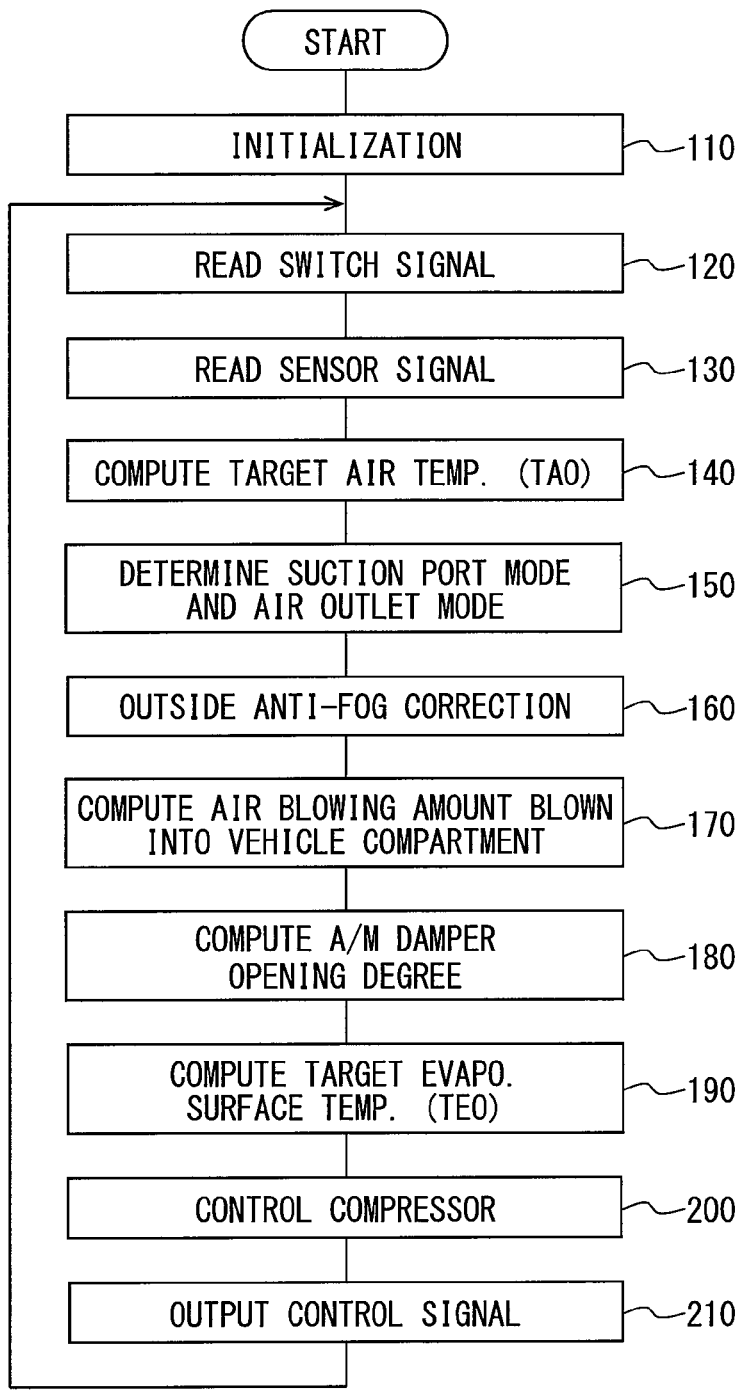
FIG. 3 is a flowchart of a basic control process by an air-conditioning ECU in the first embodiment.

Here, FIG. 3 is a flowchart of a basic control process performed by the air-conditioning ECU 7.

First, when an ignition switch is turned on and a direct-current power supply is supplied for the air-conditioning ECU 7, the routine of FIG. 3 will be started and the air-conditioning ECU 7 will perform an initialization and initial settings in Step 110. Next, switch signals are read from switches, such as a temperature setting switch, in Step 120. Next, sensor signals from the inside air temperature sensor 71, the outside air temperature sensor 72, the solar radiation sensor 73, the evaporator-surface temperature sensor 74, the water temperature sensor 75, and the humidity sensor 76 etc. are read in Step 130.

Next, a target air temperature TAO that is a target temperature of air to be blown into the vehicle compartment is computed in Step 140, based on the following expression 1 memorized by ROM in advance.

$$TAO = KSET \times TSET - KR \times TR - KAM \times TAM - KS - TS + C \quad \text{(Expression 1)}$$

In the above expression 1, TSET is a set temperature set by a temperature setting switch, TR is an inside air temperature which is detected by the inside air temperature sensor 71, TAM is an outside air temperature which is detected by the outside air temperature sensor 72, and TS is an amount of solar radiation detected by the solar radiation sensor 73. Further, KSET, KR, KAM, and KS are gains, and C is a constant for correction.

Figure 5:
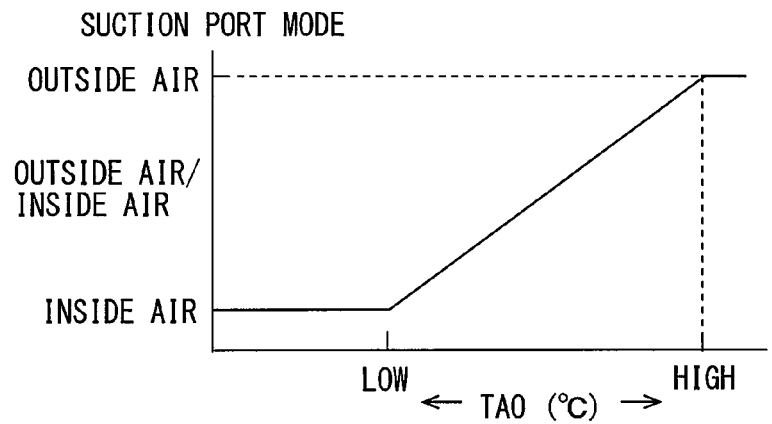
FIG. 5 is an air-suction mode characteristic diagram corresponding to a target air temperature TAO.
Figure 6:
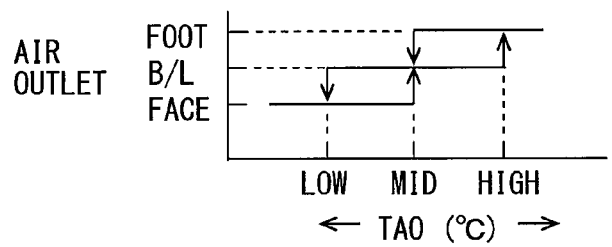
FIG. 6 is an air-outlet mode characteristic diagram corresponding to the target air temperature TAO.

After computing the target air temperature TAO in Step 140, the suction port mode and the air outlet mode (i.e., an air outlet mode), corresponding to the target air temperature TAO, will be determined in Step 150 based on the characteristic diagram (i.e., a map) in FIGS. 5 and 6 which are memorized in advance by ROM. When the suction port mode and the air outlet mode are set by a manual operation on the A/C operation panel P, the manually selected mode is set.

Figure 7:
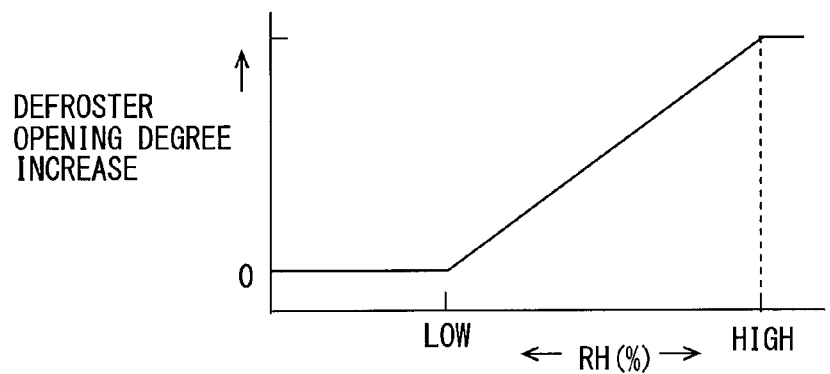
FIG. 7 is a characteristic diagram showing a defroster opening degree increase corresponding to a relative humidity RH of an inside air.

After determining the air outlet mode as described above in Step 150, an opening degree of the defroster opening 18 is increased based on the characteristic diagram (i.e., a map) in FIG. 7 memorized in advance by ROM, for example, correspondingly to the relative humidity RH of the inside air which is detected by the humidity sensor 76. As illustrated in FIG. 7, when the relative humidity RH of the inside air is equal to or greater than a predetermined value, the opening degree of the defroster opening 18 is controlled to be increased in accordance with the increase of the relative humidity RH.

In such manner, when the relative humidity RH of the vehicle compartment is relatively high and the inner surface of the window glass 5 of vehicle is prone to have dew condensation, the opening degree of the defroster opening 18 is increased for preventing a fog formation on the inner surface of the window glass 5. For example, in this case, when the face mode (i.e., a face air outlet mode) or the bi-level mode (i.e., a bi-level air outlet mode) is set, the closed defroster opening 18 is opened. Alternatively, when the foot mode (i.e., a foot air outlet mode) is set, the opening degree of the slightly-opened defroster opening 18 is increased.

The increase of the opening degree of the defroster opening 18, corresponding to the relative humidity RH of the inside air is detected by the humidity sensor 76, is explained in the above. However, the increase of the opening degree of the defroster opening 18 may preferably be performed according to the degree of ease generation of the dew condensation on the inner surface of the window glass 5, based on a dew-point temperature of the inside air and the temperature of the inner surface of the window glass 5.

The clouding phenomenon (i.e., a fog formation) on the inner surface of the window glass 5 is caused according to a glass surface temperature (i.e., a glass's inner surface temperature) Tw and a dew-point temperature Td of the air that is in contact with such surface. That is, when a relation of Tw<Td is fulfilled, the inner surface of the window glass 5 generates dew condensation and causes a fog formation.

Here, the glass surface temperature Tw is computable from TAM, TR, TS, $\alpha am$, $\alpha r$, v, δ, and λ, for example. Further, the dew-point temperature Td is computable from RH and TR (Here, $\alpha am$ is an outside-vehicle heat conductivity, $\alpha r$ is an in-vehicle heat conductivity, v is a vehicle speed, δ is a thickness of a front glass, and λ is a heat conductivity of the glass).

Further, the inner surface temperature of the window glass 5 may be detected with sufficient accuracy, by using a thermistor that is disposed in contact with the inner surface of the window glass 5 (i.e., an inner surface temperature detector).

Step 150 corresponds to an air-outlet mode setting portion which sets an air outlet mode of air blown to the vehicle compartment from the defroster opening 18 and the extra-defroster openings other than the defroster opening 18.

Figure 4:
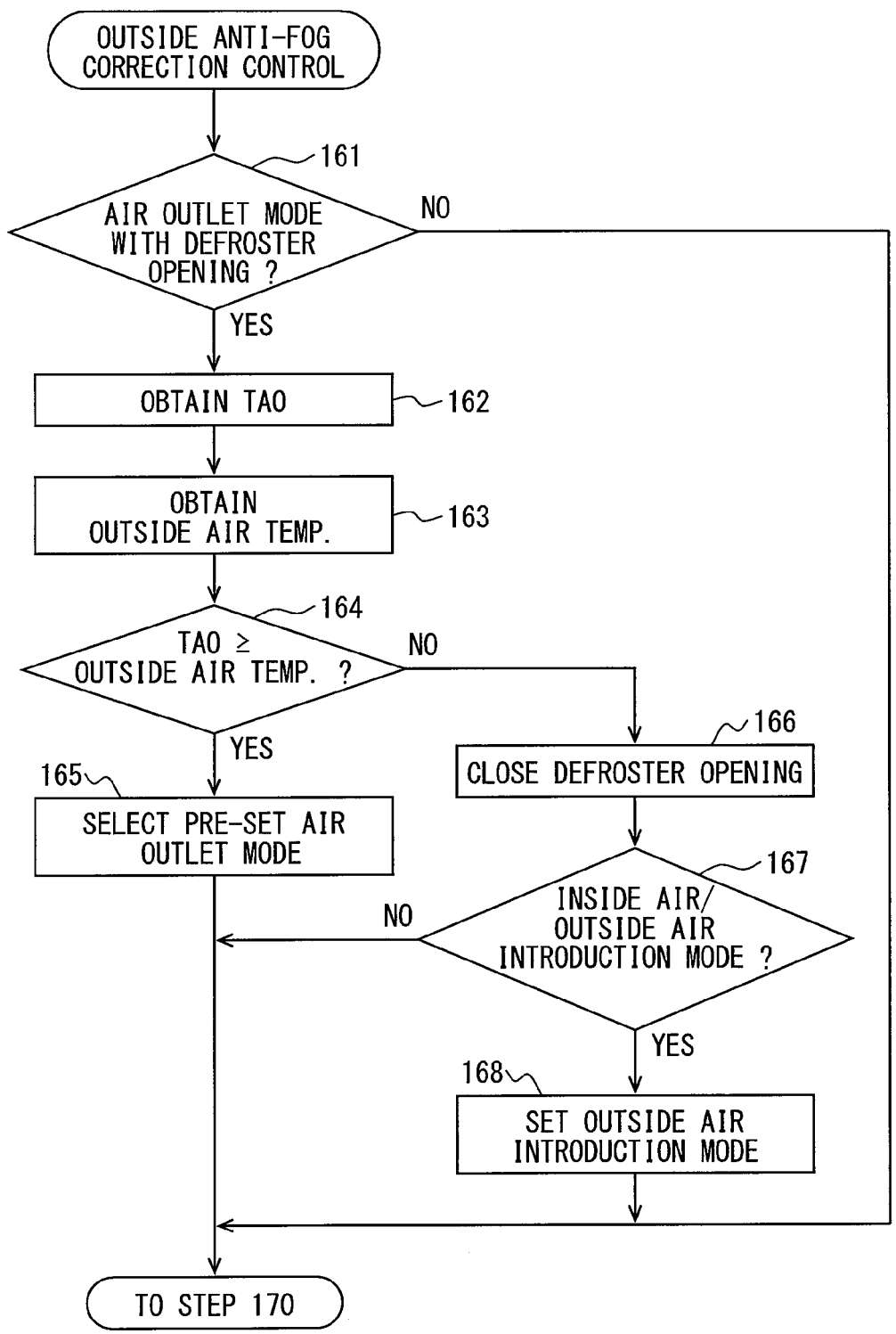
FIG. 4 is a flowchart of an outline control process in Step 160 of FIG. 3.

As explained above, after Step 150 is performed, in Step 160, a correction control for preventing an outer surface fog formation, i.e., for anti-fogging the outer surface of the window glass 5. FIG. 4 is a flowchart of an outline control process of Step 160.

As shown in FIG. 4, the air-conditioning ECU 7 determines whether an air outlet mode, in which the defroster opening 18 is open, is set (i.e., Step 161). That is, it is determined in Step 150 whether the foot air outlet mode is set, or a mode such as the face air outlet mode or the bi-level air outlet mode, where the defroster opening 18 open, is set for inner surface anti-fogging.

In Step 161, when it is determined an air outlet mode in which the defroster opening 18 does not open, the control process proceeds to Step 170.

Further, in Step 161, it is determined whether an auto mode (i.e., an air outlet automatic control mode) is set, whether an air outlet mode that is determined in correspondence to the target air temperature TAO is set, and whether an air outlet mode for anti-fogging of the inner surface of the window glass 5, in which the defroster opening 18 is opened, is set. That is, in other words, when the air outlet mode is set by a manual operation on the A/C operation panel P, the control process proceeds to Step 170, without substantially performing a correction control for an outer surface anti-fogging.

On the other hand, when it is determined that an air outlet mode with the opening of the defroster opening 18 is set in Step 161, the TAO computed in Step 140 is obtained (i.e., Step 162). In addition, the outside air temperature TAM which is detected by the outside air temperature sensor 72 is obtained (i.e., Step 163).

Here, the target air temperature TAO obtained in Step 162 corresponds to a target temperature of air which is blown from the defroster air outlet into the vehicle compartment when the defroster opening 18 is open. Therefore, Step 162 corresponds to a first temperature obtaining portion which obtains, as a first temperature, the temperature of air which is blown from the defroster air outlet in the present embodiment.

The outside air temperature TAM obtained in Step 163 is slightly higher than a dew-point temperature of the outside air on an outer surface of the window glass 5 (i.e., the outside air temperature TAM is an approximated temperature on a high temperature side, and is equal to the dew-point temperature when the relative humidity of the outside air is equal to 100%). In Step 163, the outside air temperature TAM is obtained as a relative temperature of the dew-point temperature, which is higher than the dew-point temperature of the outside air on the outer surface of the window glass 5. Step 163 corresponds to a second temperature obtaining that obtains, as the second temperature, the relative temperature of the dew-point temperature, which is associated with and which is higher than the dew-point temperature of the outside air on the outer surface of the window glass 5.

If Steps 162 and 163 are performed, then, it will be determined whether the target air temperature TAO obtained in Step 162 is equal to or greater than the outside air temperature TAM (i.e., Step 164). When it is determined in Step 164 that the target air temperature TAO is equal to or greater than the outside air temperature TAM, the air outlet mode that has already been set in Step 150 is selected in Step 165, and the control process proceeds to Step 170, since the outer surface of the window glass 5 will be not in a fog formation condition when the air is blown from the defroster air outlet toward the window glass 5.

When it is determined in Step 164 that the target air temperature TAO is lower than the outside air temperature TAM, a mode for closing the defroster opening 18 with the air outlet switching damper 21 is set against the air outlet mode that has already been set in Step 150 (i.e., Step 166), since it is highly possible that the outer surface of the window glass 5 will have a fog formation by the air blown from the defroster air outlet toward the window glass 5.

Figure 8:
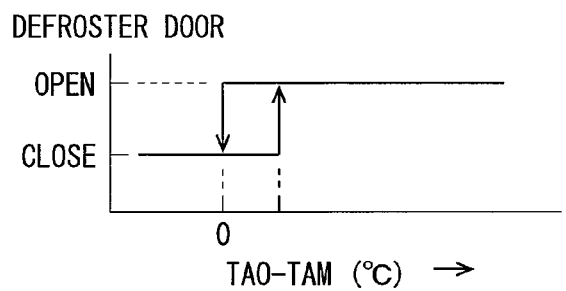
FIG. 8 is a characteristic diagram showing a switching operation used for determination at Step 164 in FIG. 4.

When a determination of Step 164 is performed, it is preferable to also consider the opening-closing state of the defroster opening 18 at a previous control flow execution time, for the switching of determination criteria (i.e., for setting a so-called hysteresis) as shown in FIG. 8, so as to prevent a hunting action of the air outlet switching damper 21.

After performing Step 166, then, it is determined whether the suction port mode having been set in Step 150 is an inside air introduction mode which introduces only the inside air or an inside-outside air introduction mode which introduces both of the inside air and the outside air (i.e., Step 167).

In Step 167, when it is determined that the suction port mode is not the inside air introduction mode or the inside-outside air introduction mode, that is, when it is determined that the suction port mode is an outside air introduction mode which introduces only the outside air, the control process proceeds to Step 170 as it is. On the other hand, in Step 167, when it is determined that the suction port mode is the inside air introduction mode or the inside-outside air introduction mode, the suction port mode is changed to the outside air introduction mode (i.e., Step 168), and the control process proceeds to Step 170.

Figure 9:
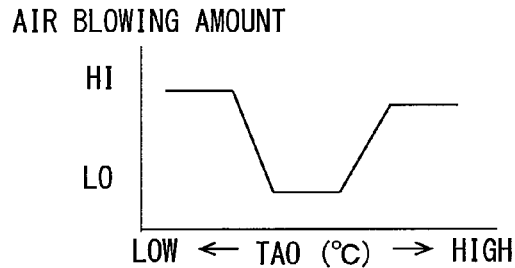
FIG. 9 is a characteristic diagram of an air blowing amount corresponding to the target air temperature TAO.

After performing Step 160 in the above-described manner, then, in Step 170, an air blowing amount (i.e., which substantially is an electric voltage impressed on the blower motor 32 of the blower 30) is determined. The air-conditioning ECU 7 determines, for example, the amount of the blow air corresponding to the target air temperature TAO based on the characteristic diagram (i.e., a map) in FIG. 9 memorized in advance by ROM.

When the amount of the blowing air is determined, then, a target damper opening degree SW of the air mix damper 52 is computed in Step 180 based on the following expression 2 memorized in advance by ROM.

$$SW=[(TAO-TE)/(TW-TE)] \times 100 \ (\%) \qquad \text{(Expression 2)}$$

In the above, TE is the evaporator-surface temperature detected by the evaporator-surface temperature sensor 74, and TW is the coolant temperature detected by the water temperature sensor 75.

When it is computed as SW≤0 (%), the air mix damper 52 is controlled to a position (i.e., a MAXCOOL position) which makes all of the cool air from the evaporator 45 bypass the heater core 51. When it is computed as SW≥100 (%), the air mix damper 52 is controlled to a position (i.e., a MAXHOT position) which causes all of the cool air to flow from the evaporator 45 to the heater core 51. When it is computed as 0 (%)<SW<100 (%), the air mix damper 52 is controlled to a middle position between the MAXCOOL position and the MAXHOT position so that a part of the cool air from the evaporator 45 passes through the heater core 51 and the rest of the cool air bypasses the heater core 51.

Next, the control process proceeds to Step 190, and the target evaporator-surface temperature TEO is computed for the control of operation of the compressor 41. The air-conditioning ECU 7 computes the target evaporator-surface temperature TEO for obtaining the outer surface temperature of the heat exchanging portion of the evaporator 45. The outer surface temperature of the heat exchanging portion of the evaporator 45 is required when performing each of the following controls, i.e., a temperature adjustment control of the vehicle compartment, a comfort humidity control of the vehicle compartment, an anti-fog control of the inner surface of the window glass, and the like.

Here, the temperature adjustment control is a control which controls operation of the compressor 41, so as to obtain the target evaporator-surface temperature in accordance with the target air temperature TAO. The comfort humidity control is a control which controls operation of the compressor 41, so as to obtain the target evaporator-surface temperature in accordance with a humidity of the vehicle compartment, so that the humidity in the vehicle compartment is between an upper limit set value and a lower limit set value. Further, the anti-fog control is a control which controls operation of the compressor 41 so as to obtain the target evaporator-surface temperature, such that the humidity of the vehicle compartment does not reach a fogging limit humidity with respect to the outside air temperature.

The control process proceeds to Step 200 after setting the target evaporator-surface temperature TEO, and the air-conditioning ECU 7 determines a control state of the compressor 41 so that the detection temperature TE of the evaporator-surface temperature sensor 74 approaches the target evaporator-surface temperature TEO.

Next, in Step 210, control signals are output so that each of the control states computed or determined in the above-mentioned steps 150, 160, 170, 180, and 200 can be obtained. Then, the control process returns to Step 120.

According to the above-mentioned configuration and operation, even in a case where an air outlet mode is set in Step 150 of FIG. 3, in which the air is blown from the defroster air outlet toward the inner surface of the window glass 5 of the vehicle by the control of the air outlet switching damper 21 to open the defroster opening 18, the air outlet switching damper 21 is controlled by the air-conditioning ECU 7 to close the defroster opening 18 in Step 166 when it is determined in Step 164 of FIG. 4 that the target air temperature TAO is lower than the outside air temperature TAM.

In a case where the target air temperature TAO which is a target temperature of the air blown from the defroster air outlet is lower than the outside air temperature TAM that is slightly higher than the dew-point temperature of the outside air on the outer surface of the window glass 5, if the air is blown from the defroster air outlet toward the window glass 5, a fog is easy to be generated on the outer surface of the window glass 5. According to the present embodiment, even in an air outlet mode in which air is blown from the defroster air outlet toward the window glass 5, an air blowing toward the inner surface of the window glass 5 is prohibited by closing the defroster opening 18, thereby preventing a fog formation on the outer surface of the window glass 5.

In addition, since the above operation for preventing the fog formation on the outer surface of the window glass 5 only prohibits the air blown from the defroster air outlet without raising the temperature of the air blown into the vehicle compartment, the temperature comfort in the vehicle compartment will not be decreased, even when, for example, the outside air temperature is relatively high.

Further, in Step 163 of FIG. 4, the outside air temperature TAM is obtained as a relative temperature of the dew-point temperature, which is relative with and which is higher than the dew-point temperature of the outside air on the outer surface of the window glass 5. The outside air temperature TAM is a temperature equivalent to a dew-point temperature of the outside air when the relative humidity of the outside air is 100%, and it usually is slightly higher than the dew-point temperature of the outside air when the relative humidity is less than 100%. Therefore, the relative temperature of the dew-point temperature that is slightly higher than the dew-point temperature of the outside air on the outer surface of the window glass 5 and that is required in order to determine whether the defroster opening 18 should be closed for anti-fogging of the outer surface of the window glass 5, can be easily obtained, without performing a humidity detection of the outside air.

Further, if a correction control for closing the defroster opening 18 is performed during an air outlet mode for opening the defroster opening 18 by executing Step 166 of FIG. 4, the suction port mode is set to the outside air introduction mode in Steps 167 and 168.

According to the above, when air blowing toward the inner surface of the window glass 5 is prohibited by closing the defroster opening 18 in order to anti-fog the outer surface of the window glass 5, the outside air that has generally lower humidity than the inside air is positively introduced into the air conditioning duct 10. Therefore, even if the air blowing toward the inner surface of the window glass 5 is prohibited by closing the defroster opening 18, the conditioned air having relatively-low humidity is blown into the vehicle compartment from opened extra-defroster openings other than the defroster opening 18, and the fog formation on the inner surface of the window glass 5 can be prevented.

(Other Embodiments)

The present disclosure is not limited to the examples of the above-described embodiment, and has various changes and modifications without departing from the scope of the disclosure.

Although the first temperature obtained in Step 162 is used as the target air temperature TAO in the above-mentioned embodiment, it needs not be limited to such form. For example, a thermistor or the like may be provided in the defroster air outlet as an air temperature detector, and the temperature of air blown from the defroster air outlet may be detected and obtained.

Although the second temperature obtained in Step 163 is used as the outside air temperature TAM in the above-mentioned embodiment, it needs not be limited to such form. The second temperature may be other temperature, i.e., the dew-point temperature of the outside air on the outer surface of the window glass 5, or a relative temperature of the dew-point temperature which is relative with and which is higher than the dew-point temperature.

Figure 10:
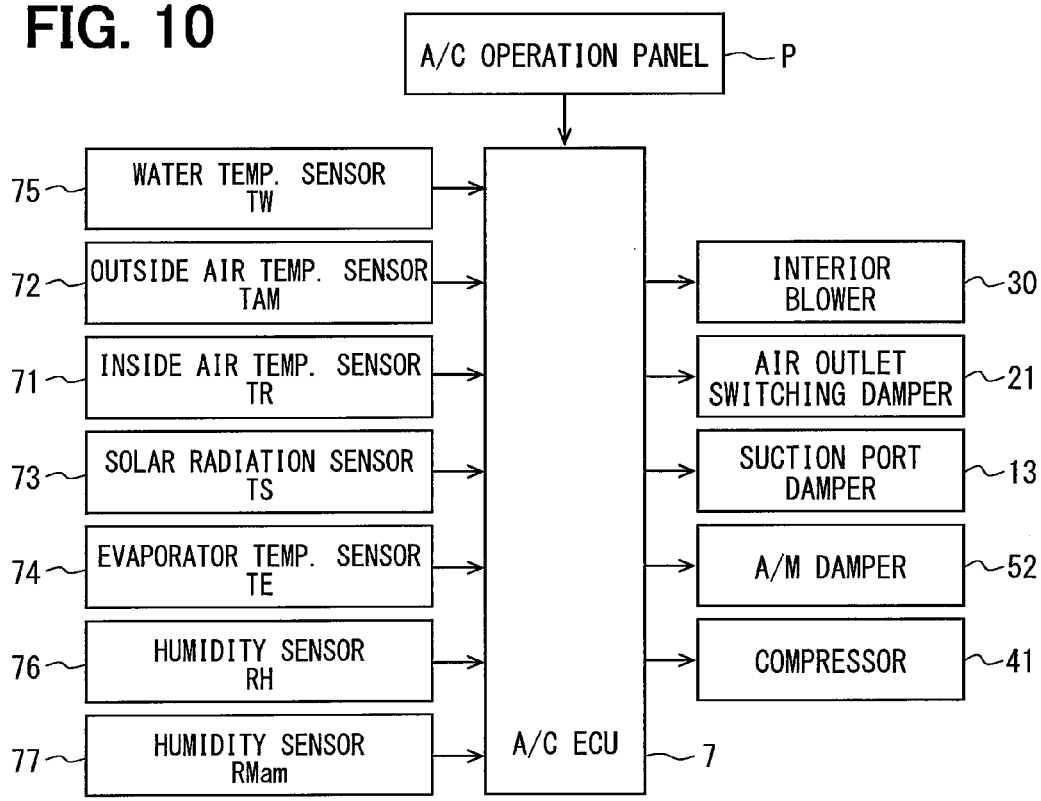
FIG. 10 is a block diagram showing a control system of a vehicle air conditioner in another embodiment.

For example, as shown in FIG. 10, a humidity sensor 77 may be provided as an outside air humidity detector, and the second temperature may be computed and obtained as a dew-point temperature of the outside based on the outside air temperature TAM detected by the outside air temperature sensor 72 and an outside air relative humidity RHam detected by the humidity sensor 77. In addition to the above, a thermistor (i.e., an outer surface temperature detector) may be disposed in contact with the outer surface of the window glass 5 to accurately detect the temperature of the outer surface of the window glass 5, thereby accurately obtaining a dew-point temperature of the outside air on the outer surface of the window glass 5.

Further, the second temperature obtained in Step 163 may be used as the outer surface temperature of the window glass 5. Further, a reference temperature that varies according to a change in the dew-point temperature of the outside air and is lower than the dew-point temperature may be detected, and the second temperature may be computed and obtained as a corrected temperature of the reference temperature by adding a predetermined value to the reference temperature, for example.

Further, the determination in Step 167 of the above-mentioned embodiment, the air introduction mode is switched to the outside air introduction mode in Step 168 if the outside air introduction mode is not set at the time of the determination. However, such control may be changed. For example, in addition to the determination in Step 167, other determination such as a dew condensation easiness determination on the inner surface of the window glass 5 may be performed based on the dew-point temperature of the inside air, and the air introduction mode may be switched to the outside air introduction mode when it is determined that the anti-fog operation of the inner surface of the window glass 5 is required.

Further, in the above-mentioned embodiment, when a setting change to close the defroster opening 18 is performed in Step S166, the suction port mode is set to the outside air introduction mode in Steps 167 and 168. However, such control may be changed. For example, when the defroster opening 18 is closed, a ratio of the outside air introduction may be increased.

Further, it is not limited to an increase of the outside air introduction ratio, either. For example, the blower motor 32 which serves as the air amount regulator may be controlled to increase the amount of air that is blown into the vehicle compartment. According to such operation, when the blowing of the air toward the inner surface of the window glass 5 is prohibited by closing the defroster opening 18, the amount of air which is blown into the vehicle compartment from the extra-defroster openings in an open state is increased. Therefore, the air circulation in the vehicle compartment becomes active, and the air ventilation in the vehicle compartment, which is not completely air-tight in general, is facilitated. Thus, even when the defroster opening 18 is closed, the fog formation on the inner surface of the window glass 5 can be prevented. For the increase of the amount of the air blown into vehicle compartment, it is preferable to set the suction port mode at the one that introduces the outside air, because such air introduction mode setting further facilitates the air ventilation in the vehicle compartment.

Further, for example, the compressor 41 which is a cooling capacity adjustor may be controlled so as to increase the air cooling capacity at the evaporator 45, and the air mix damper 52 which is a temperature adjustor may be controlled, such that the air temperature blown from the extra-defroster openings other than the defroster opening 18 will not be changed before and after the increase of the cooling capacity of the evaporator 45 as the air cooling capacity of the evaporator 45 increases. Controlling the compressor 41 to increase the air cooling capacity of the evaporator 45 means that (i) turning the compressor 41 to an ON state if the compressor 41 is in an OFF state, or (ii) increasing a refrigerant discharge amount when the compressor 41 is in an ON state.

According to the above, when blowing of the air toward the inner surface of the window glass 5 is prohibited by closing the defroster opening 18, the compressor 41 is controlled to increase the air cooling capacity of the evaporator 45. Further, the air mix damper 52 is controlled so that the temperature of the air blown into the vehicle compartment is kept to be unchanged. Therefore, the air is dehumidified by the increase of the cooling capacity of the evaporator 45, the temperature of the cooled air for dehumidification is adjusted by the air mix damper 52, and the dehumidified air is blown from the extra-defroster openings in an open state into the vehicle compartment. Thus, even when the defroster opening 18 is closed, the fog formation on the inner surface of the window glass 5 can be prevented.

When the air outlet mode setting is changed so as to close the defroster opening 18 in Step 166, the conditioned air blown from the defroster air outlet is prohibited. However, even when the defroster opening 18 is closed, the fog formation on the inner surface of the window glass 5 can be prevented by performing one of the above-described increases or by performing a combination of two or more of the same, i.e., the increase of the outside air introduction ratio, the increase of the flow amount of the air blown into the vehicle compartment, and the increase of the cooling capacity of the air by the evaporator 45.

In the above-mentioned embodiment, when the auto mode (i.e., an air outlet automatic-control mode) is set, the correction control of FIG. 4 is performed for the outside anti-fogging, or, when the air outlet mode is set by the manual operation, the correction control for the outside anti-fogging will not be substantially performed. However, even when the air outlet mode is set by the manual operation, the correction control for the outside anti-fogging may be performed.

In the above-mentioned embodiment, the window glass 5 is a front windshield of the vehicle. However, the window glass 5 may be a glass of other windows in the vehicle. For example, the invention of the present disclosure may be applicable to an anti-fogging of a window glass of a side window or of a window glass of a rear window.

What is claimed is:

1. An air conditioner for a vehicle, comprising:
an air conditioning duct forming therein an air passage through which air to be blown into a vehicle compartment flows;
a defroster opening that is provided in the air conditioning duct and is connected to a defroster air outlet from which air is blown toward an inner surface of a window glass of the vehicle;
non-defroster openings that are provided in the air conditioning duct and are respectively connected to non-defroster air outlets other than the defroster air outlet, from which air is blown into the vehicle compartment;
a door device that opens and closes the defroster opening;
a cooling heat exchanger that cools air flowing in the air conditioning duct;
a cooling capacity adjustor that adjusts a cooling capacity of the cooling heat exchanger;
a temperature adjustor that performs a temperature adjustment of the air previously cooled by the cooling heat exchanger; and
a controller that includes:
an air-outlet mode setting portion that sets an air outlet mode of air blown into the vehicle compartment from the defroster opening and the non-defroster openings;
a first temperature obtaining portion that obtains, as a first temperature, a temperature of air to be blown from the defroster air outlet; and
a second temperature obtaining portion that obtains, as a second temperature, one of (i) a dew-point temperature of outside air on an outer surface of the window glass, and (ii) a relative temperature of the dew-point temperature, which is relative with and is higher than the dew-point temperature, wherein
the controller controls an open/close operation of the door device based on the air outlet mode, the first temperature, and the second temperature,
the controller operates the door device to close the defroster opening when the first temperature is lower than the second temperature, even in a case where the air-outlet mode setting portion sets an air outlet mode in which the door device generally opens the defroster opening, and
the controller (i) controls the cooling capacity adjustor to increase the cooling capacity of air at the cooling heat exchanger, (ii) controls the door device such that air is blown into the vehicle compartment from the non-defroster openings in an open state, and (iii) controls the temperature adjustor not to change the temperature of air blown from the non-defroster openings into the vehicle compartment before and after the increase of the cooling capacity of air at the cooling heat exchanger, when the door device is controlled by the controller to close the defroster opening based on the first temperature and the second temperature in a case where the air-outlet mode setting portion sets an air outlet mode in which the door device opens the defroster opening.

2. The air conditioner for a vehicle according to claim 1, wherein
the second temperature obtaining portion obtains an outside air temperature that is the relative temperature of the dew-point temperature, as the second temperature.

3. The air conditioner for a vehicle according to claim 1, further comprising:
an inside-outside air ratio regulator that regulates a flow ratio of inside air and outside air respectively introduced into the air conditioning duct, wherein
the controller (i) controls the inside-outside air ratio regulator to increase the flow ratio of the outside air introduced into the air conditioning duct and (ii) controls the door device such that air is blown into the vehicle compartment from the non-defroster openings in an open state, when the controller operates the door device to close the defroster opening based on the first temperature and the second temperature in a case where the air-outlet mode setting portion sets an air outlet mode in which the door device opens the defroster opening.

4. The air conditioner for a vehicle according to claim 1, further comprising
an air amount regulator which regulates a flow amount of air to be blown into the vehicle compartment, wherein
the controller (i) controls the air amount regulator to increase an amount of air to be blown into the vehicle compartment and (ii) controls the door device such that air is blown into the vehicle compartment from the non-defroster openings in an open state, when the controller controls the door device to close the defroster opening based on the first temperature and the second temperature in a case where the air-outlet mode setting portion sets an air outlet mode in which the door device opens the defroster opening.

* * * * *